(12) United States Patent
Mastropaolo

(10) Patent No.: US 6,658,784 B1
(45) Date of Patent: Dec. 9, 2003

(54) FISHING LURE

(76) Inventor: Steven Mastropaolo, 6 Monroe St., Gloversville, NY (US) 12078

( * ) Notice: Subject to any disclaimer, the term of this patent is extended or adjusted under 35 U.S.C. 154(b) by 0 days.

(21) Appl. No.: 10/156,614

(22) Filed: May 28, 2002

(51) Int. Cl.[7] ............ A01K 91/08; A01K 91/053
(52) U.S. Cl. .............. 43/43.13; 43/42.22; 43/42.23
(58) Field of Search .............. 43/43.13, 43.12, 43/42.22, 42.23

(56) References Cited

U.S. PATENT DOCUMENTS

| | | | | |
|---|---|---|---|---|
| 2,062,718 A | * | 12/1936 | Kallberg | 43/43.13 |
| 2,741,863 A | * | 4/1956 | Magill | 43/43.13 |
| 2,789,386 A | * | 4/1957 | Creelman | 43/43.13 |
| 2,825,994 A | * | 3/1958 | Bruhn | 43/43.13 |
| 2,843,966 A | * | 7/1958 | Ingram et al. | 43/43.13 |
| 2,914,884 A | * | 12/1959 | Dahl | 43/43.13 |
| 2,920,414 A | * | 1/1960 | Koepplin | 43/43.13 |
| 2,924,907 A | * | 2/1960 | Hamilton | 43/43.13 |
| 2,933,848 A | * | 4/1960 | Tollefson | 43/43.13 |
| 2,942,371 A | * | 6/1960 | Johnson et al. | 43/43.13 |
| 3,044,208 A | * | 7/1962 | Minera | 43/43.13 |
| 3,216,147 A | * | 11/1965 | Minera | 43/43.13 |
| 3,318,036 A | * | 5/1967 | McGuire | 43/43.12 |
| 3,401,483 A | * | 9/1968 | Bellah et al. | 43/43.13 |
| 3,410,014 A | * | 11/1968 | Jenssen | 43/43.13 |
| 3,543,431 A | * | 12/1970 | Olds | 43/43.13 |
| 3,570,167 A | * | 3/1971 | Smith | 43/43.13 |
| 3,898,759 A | * | 8/1975 | Jensen | 43/43.13 |
| 3,943,653 A | * | 3/1976 | Reckler | 43/43.13 |
| 4,028,839 A | * | 6/1977 | Stubblefield | 43/43.13 |
| 4,161,078 A | * | 7/1979 | Pagani | 43/43.13 |
| 4,161,841 A | * | 7/1979 | Holstein | 43/43.13 |
| 4,212,127 A | * | 7/1980 | Daniels | 43/43.13 |
| 4,254,573 A | * | 3/1981 | Mastropaolo | 43/43.13 |
| 4,255,890 A | * | 3/1981 | Smith | 43/43.13 |
| 4,486,970 A | * | 12/1984 | Larson | 43/43.13 |
| 4,646,463 A | * | 3/1987 | Koch | 43/43.13 |
| 4,703,580 A | * | 11/1987 | Kammeraad | 43/43.13 |
| 4,745,702 A | * | 5/1988 | Koch | 43/43.13 |
| 4,831,769 A | * | 5/1989 | Skille | 43/43.13 |
| 4,894,946 A | * | 1/1990 | Fukushima | 43/43.13 |
| 4,920,689 A | * | 5/1990 | Anderson | 43/43.13 |
| 5,018,296 A | * | 5/1991 | Putz, II | 43/42.13 |
| 5,165,196 A | * | 11/1992 | Spickelmire | 43/43.13 |
| 5,265,367 A | * | 11/1993 | Kinoshita | 43/43.13 |
| 5,283,972 A | * | 2/1994 | Kinoshita | 43/43.13 |
| 5,341,591 A | * | 8/1994 | Hicks | 43/43.13 |
| 5,355,615 A | * | 10/1994 | Spickelmire | 43/43.13 |
| 5,417,008 A | * | 5/1995 | Smith | 43/43.12 |
| 6,055,765 A | * | 5/2000 | Ruppa | 43/43.13 |

FOREIGN PATENT DOCUMENTS

DE    4338138 B1 *  5/1994
GB    2299253 B1 * 10/1996

* cited by examiner

Primary Examiner—Darren W. Ark

(57) ABSTRACT

A fishing lure capable of numerous operations to attract fish including a keel with a base platform at one end and an upper body at the other end. Forward fins are mounted on the upper body and a plurality of openings for tow points are provided. A tail rudder which can be rotated to provide various movements of the fishing lure is also mounted on the upper body. A bait line hook is mounted on the base platform to hold a fishing line.

20 Claims, 6 Drawing Sheets

FISHING LURE

BACKGROUND OF THE INVENTION

1. Field of the Invention

This invention pertains to fishing devices and more particularly to a fishing lure to be towed by a boat to lure fish to strike at bait attached to the fishing lure.

2. Prior Art and Objects

Devices are known which oscillate under water and simulate the movement of fish which attracts larger fish to strike. One patent pertaining to such a trolling device is Mastropaulo, U. S. Pat. No. 4,254,573 which was issued on Mar. 10, 1981. This device offered a trolling device that worked well. Since then further development has resulted in substantial improvements to create a trolling device or fishing lure which can with predictability perform five separate patterns as follows:

1. Down Rigger
2. Surface
3. Out and Down
4. High Speed Trolling
5. Predator Pattern In the development of the fishing lure which is the subject of this invention, it was also essential, in addition to the capabilities set forth above, to produce a device that is durable and can be easily adjusted to perform its specifically desired function.

Accordingly, it is an object of this invention to produce a fishing lure that can perform a multiplicity of fishing patterns.

It is another object of this invention to produce a fishing lure that is durable.

It is still another object of this invention to produce a fishing lure that is buoyant and will float to the surface should it become disconnected from its line or lines.

It is still a further object of this invention to produce a lure that is economical.

These and other objects will be apparent to one skilled in the art when the claims are read in conjunction with the Detail Description of the Preferred Embodiment.

SUMMARY OF THE INVENTION

A fishing lure is provided which is towed by a boat and having a bait line attached to the fishing lure. The fishing lure includes a keel which is a flat sheet with a forward end and a tail end and an upper edge and a lower edge. A keel member is affixed generally at right angles to the upper edge of the keel along the longitudinal axis of the keel member. The keel is secured at its lower edge to the base platform substantially at right angles to the base platform. The keel member is secured to an upper enclosure which has an upper surface. Forward fins are removably mounted on the upper surface of the upper enclosure while forward fins are removably mounted on the upper surface of the upper enclosure toward the forward end. A tail rudder is removably mounted on the upper surface of the upper enclosure toward the tail end. The tail rudder includes a pair of swept back wings and a pair of rudders with rudders mounted on the outside edges of the wings. A bait line is mounted on the base platform.

DETAILED DESCRIPTION OF THE DRAWINGS

DETAILED DESCRIPTION OF THE NUMERALS

| NUMERAL | DESCRIPTION |
| --- | --- |
| 11 | Upper Body |
| 13 | Base Platform |
| 14 | Longitudinal Axis |
| 15 | Keel |
| 17 | Forward End |
| 18 | Opening |
| 19 | Tail End |
| 20 | Opening |
| 21 | Upper Edge |
| 23 | Lower Edge |
| 25 | Top edge |
| 27 | Keel Member |
| 28 | Longitudinal Axis |
| 29 | Upper Enclosure |
| 30 | Longitudinal Axis |
| 31 | Foam |
| 33 | Upper Surface |
| 35 | Forward Section |
| 37 | Tail Section |
| 39 | Forward Fins |
| 41 | Five Openings |
| 43 | Two Bolts |
| 45 | Three Bolt Holes |
| 47 | Tail Rudder |
| 49 | Swept Back Wings |
| 51 | Two Rudders |
| 53 | Outside Edges |
| 55 | Curved Slot |
| 56 | Bolt Opening |
| 57 | Bolt Hole |
| 59 | Bolt |
| 61 | Retainer Bolt |
| 63 | Pivot Hole |
| 65 | Wide Section |
| 67 | Narrow Section |
| 69 | Slot |
| 71 | Bait Line Hook |
| 73 | Indentations |
| 75 | Pair Of Mountings |
| 77 | Single Mounting |
| 79 | Threaded Opening |
| 81 | Bolt |

DETAILED DESCRIPTION OF THE PREFERRED EMBODIMENT

Figure 1:
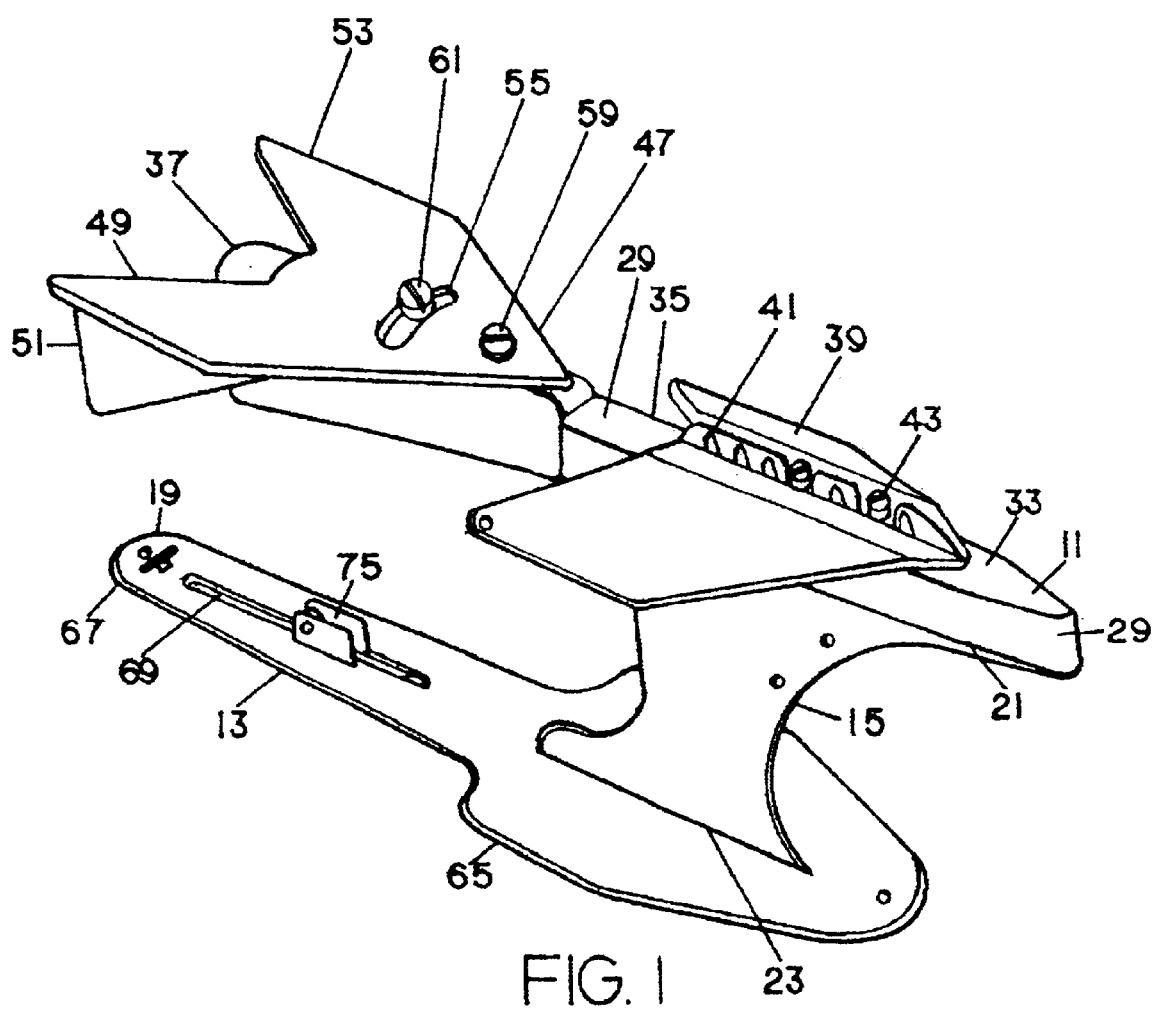
FIG. 1 is a pictorial view of the fishing lure.
Figure 2:
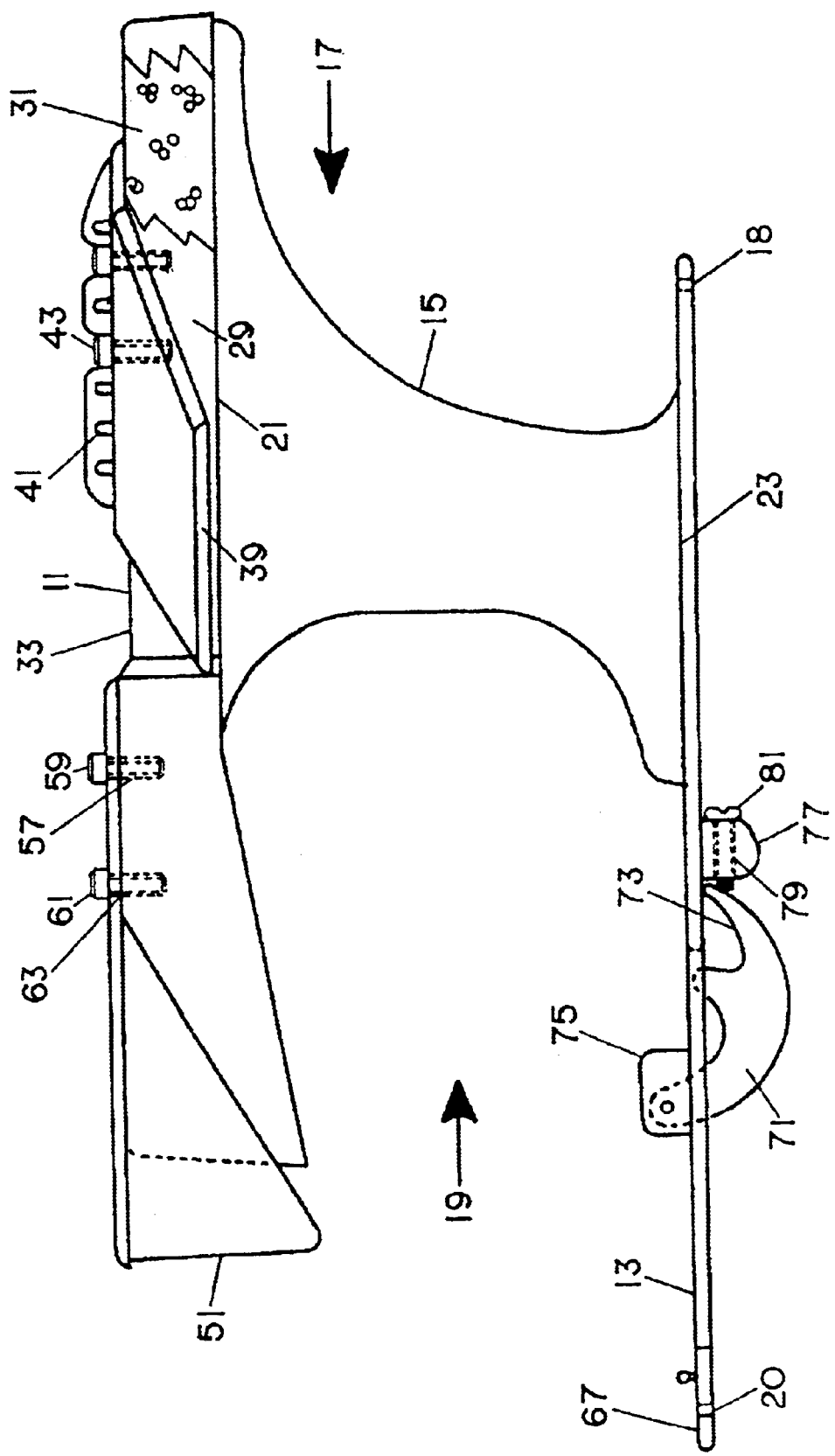
FIG. 2 is side elevation of the lure when adapted for low speed operation.

Referring now to FIG. 1 and FIG. 2, the fishing lure has an upper body 11 and a base platform 13. Between the upper body 11 and the base platform 13, a keel 15 is located. The fishing lure itself as well as the upper body 11, the keel 15 and the base platform 13, as well as other parts of the fishing lure have the same forward end 17 and tail end 19.

The keel 15 is a flat sheet. The keel 15, besides having the forward end 17 and the tail end 19, also has an upper edge 21 which is connected to the upper body 11 and a lower edge 23 which is connected to the base platform 13. The forward end 17 of the keel 15 extends from the upper body 11 at the forward end 17 of the upper body 11 toward the tail end 19 of the keel 15 and downwardly toward the base platform 13 and turns back toward the forward end 17 of the base platform 13 adjacent the base platform 13. An opening 18 is located in the base platform 13 toward the forward end 17. The base platform 13 has a longitudinal axis 14 The tail end 19 of the keel 15 extends toward the forward end 17 of the keel 15 adjacent the upper body 11 and then extends substantially straight toward the base platform 13 and then slopes toward the tail end 19 of the base platform 13 adjacent the base platform 13. An opening 20 is located in the base platform 13 toward the tail end 19. In general, the forward end 17 of the keel 15 and the tail end 19 of the keel 15 slope toward each other between the base platform 13 and the upper body 11.

Small weights (not shown) may be suspended from either the opening 18 or the opening 20 in the base platform 13 to provide a desired change in the pitch of the fishing lure.

Figure 5:
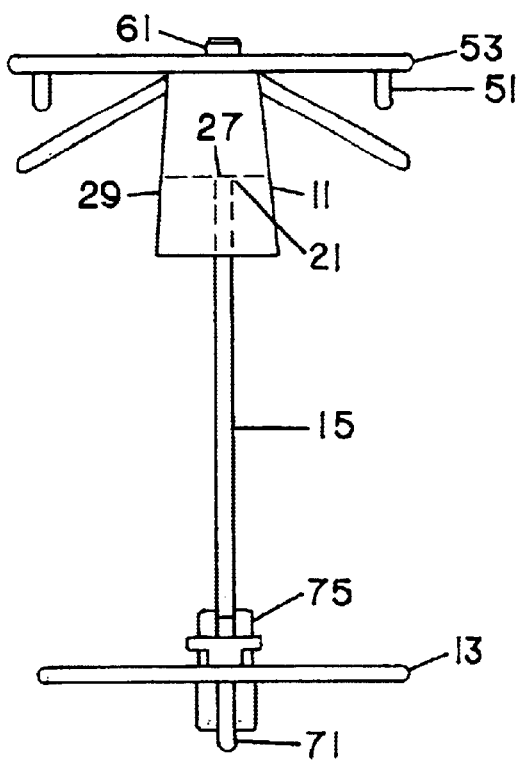
FIG. 5 is a rear elevation of the lure when adapted for high speed operation.

As best seen in FIG. 5, the keel 15 at its upper edge 21 is secured to a keel member 27. The keel member 27 is flat and elongated and extends from the forward end 17 of the upper body 11 to the tail end 19 of the upper body 11. The keel member 27 has a longitudinal axis 28. Toward the tail end 19 of the fishing lure, the keel member 27 slopes downwardly toward the base platform 13.

Figure 4:
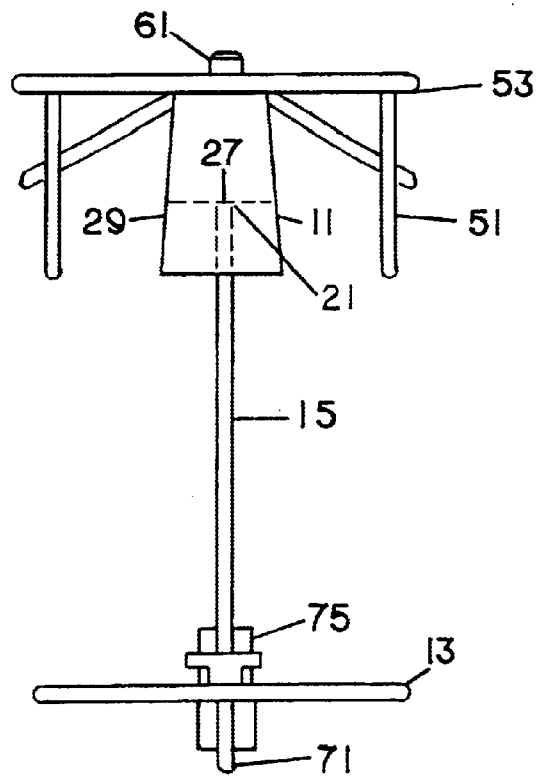
FIG. 4 is a rear elevation of the lure when adapted for low speed operation.

Referring to FIGS. 2, 4 and 5, the keel member 27 is secured into an upper enclosure 29. The upper enclosure 29 has substantially the cross section of an inverted U and has a longitudinal axis 30. The keel member 27 is sealed to the bottom of the upper enclosure 29 thereby closing the open part of the U. The upper enclosure 29 and the keel member 27 form the upper body 11 which is a sealed chamber that is water tight and is further filled with foam 31. The upper body 11 provides buoyancy to the fishing lure but in the event of a leak in the upper body 11, the foam 31 retains the necessary buoyancy to cause the fishing lure to float to the surface if not being towed.

The upper enclosure 29 has a upper surface 33 that is generally flat. The upper surface 33 has a forward section 35 and a tail section 37 both of which are flat but the tail section 37 is slightly elevated above the forward section 35 so that the tail section 37 of the upper surface 33 is slightly further removed form the base platform 13. The forward section 35 is located toward the forward end 17 and the tail section 37 is located toward the tail end 19.

On the forward section 35 of the upper surface 33, forward fins 39 are located. The forward fins 39 are swept back. The forward end 17 of the forward fins 39 is swept back at an angle slightly greater than the tail end 19 of the forward fins 39. The forward fins 39 also slope slightly downwardly from the upper surface 33 of the upper body 11 toward the base platform 13. On the top of the forward fins 39, along the center of the forward fins 39, is a series of five openings 41 used to tow the fishing lure with different results being achievable depending upon which one of the five openings 41 is used.

The forward fins 39 are secured to the upper surface 33 by two bolts 43. The upper surface 33 of the upper enclosure 39, however, has three bolt holes 45 which permits the forward fins 39 to be mounted in a plurality of positions. The forward fins 39 may, as a result of the bolt holes 45, be moved toward the forward end 17 or back toward the tail end 19 by a distance of one inch. The change in the center of pressure results in a change in the dive angles. At a speed above ten miles per hour, the forward fins 39 is placed toward the forward end 17. As a result, dive angles decrease and the fishing lure can be used up to nineteen miles per hour. Below ten miles per hour, the forward fins 39 are placed toward the tail end 19. However, the angle of dive always increases with an increase in speed.

Figure 3:
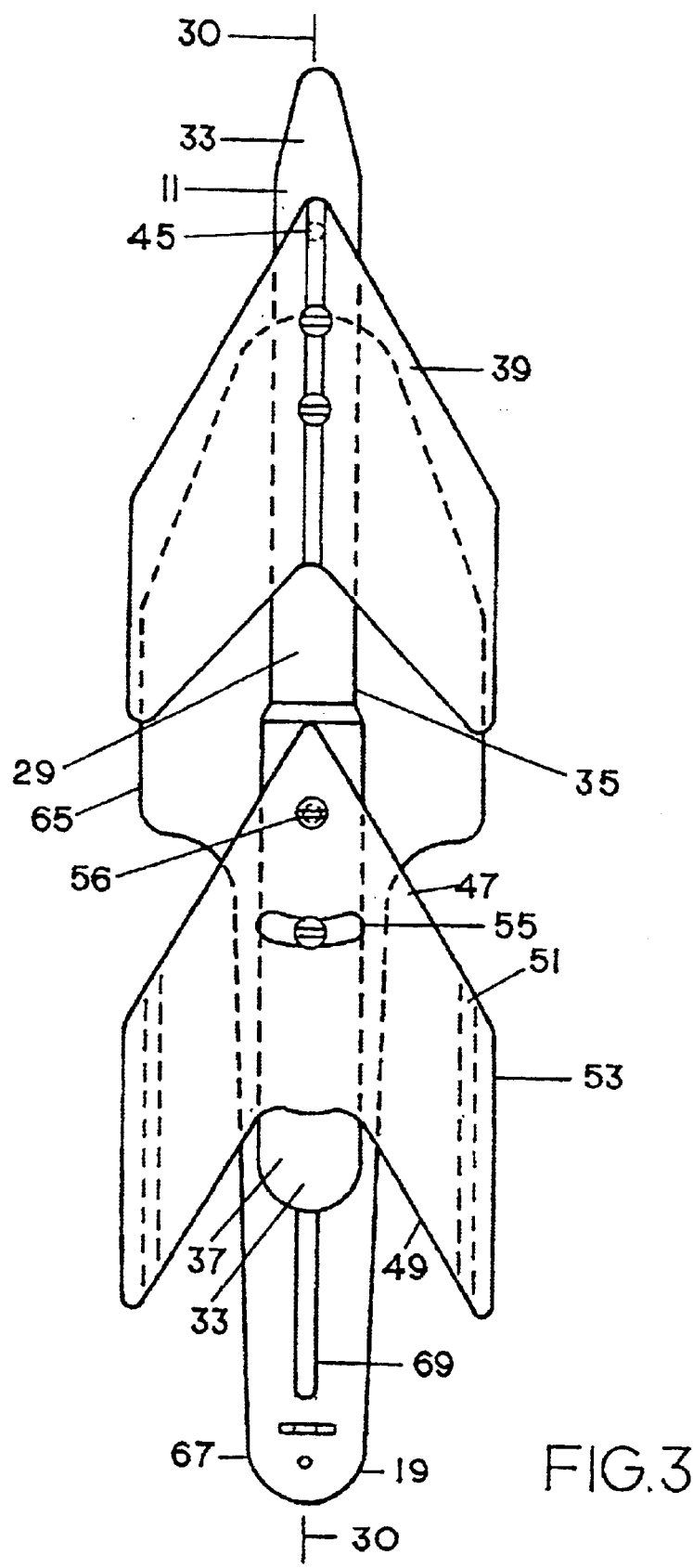
FIG. 3 is a top plan view of the lure when adapted for low speed operation.
Figure 6:
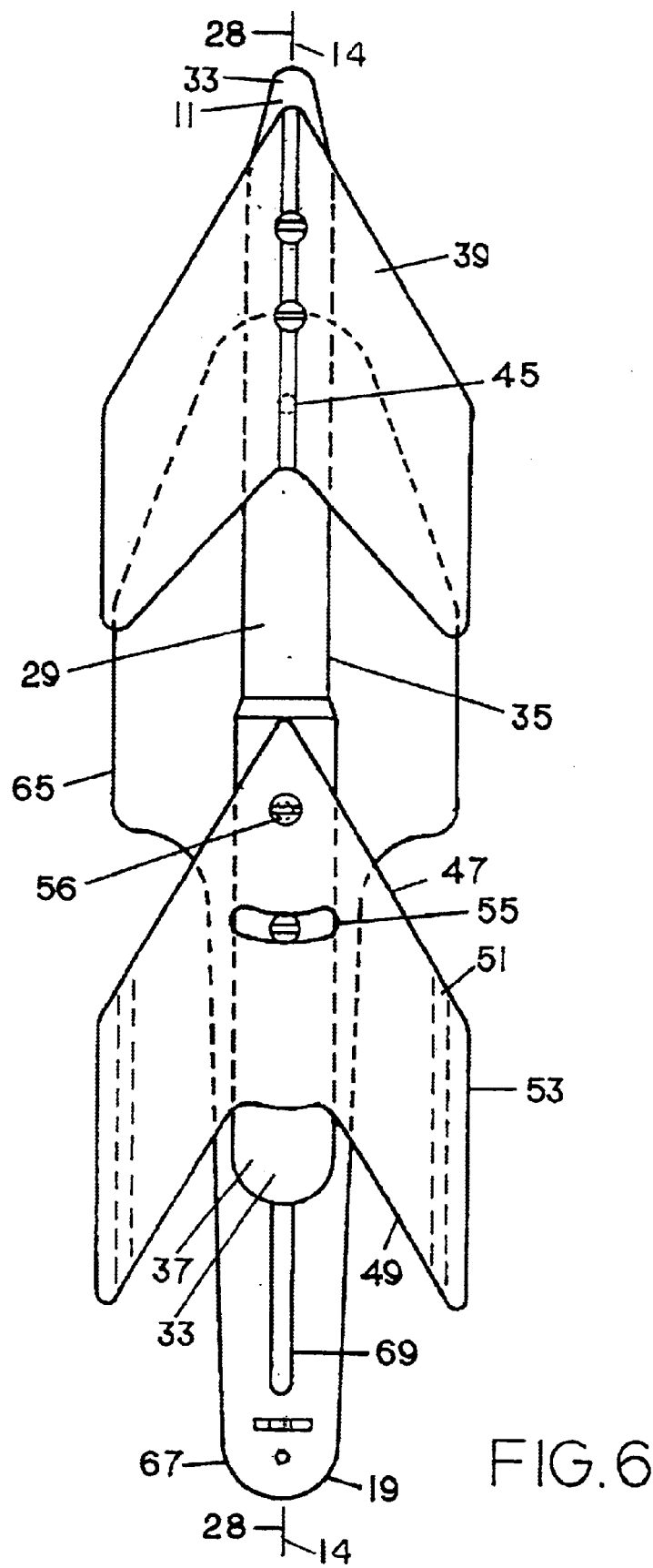
FIG. 6 is a top plan view of the lure when adapted for high speed operation.
Figure 7:
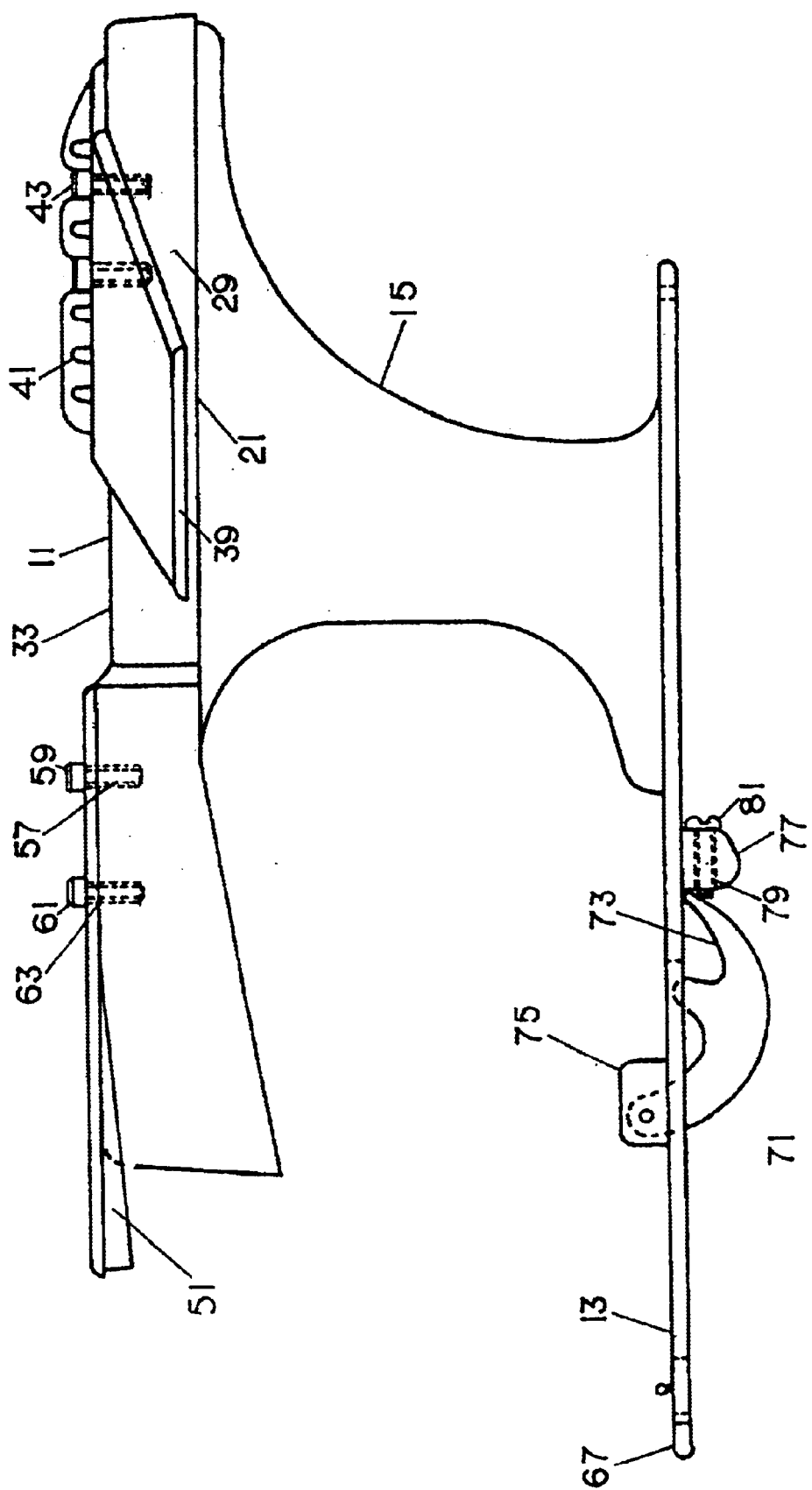
FIG. 7 is a side view similar to FIG. 2 but with a tail section for high speed operation.

In a low speed operation, as shown in FIG. 3, the two of the the three bolt holes 45 toward the tail end 19 of the fishing lure are used. As shown in FIG. 6, with a high speed operation, two of the three bolt holes 45 toward the forward end 17 of the upper surface 33 are used. With high speed usage, the forward fins 39 are closer to the forward end 17 of the fishing lure and further from the tail end 19 of the fishing lure than with a low speed operation.

The forward fins 39 incorporate an aspect ration of approximately one. Aspect ration is defined by the span divided by the mean chord of the forward fins 39. The forward fins 39 are swept back thirty degrees and this degree of back sweep with the aspect ration results in unstable design. This is done so that the small differences between the five openings 41 used as the tow points results in substantial changes in the resulting dive angle which can change from ten degrees to eighty-five degrees. The result is that fishing with the fishing lure can be either deep or shallow.

The upper enclosure 29 at the tail section 37, as previously stated, is slightly elevated over the forward section 35 where the forward fins 39 are located. On the tail section 37, a tail rudder 47 is located. The tail rudder 47 has two components, namely a wing component which includes a pair of swept back wings 49 and a rudder component which includes two rudders 51 extending downwardly from the swept back wings 49. The swept back wings 49 are flat and swept back across the upper enclosure 29 and do not slope as do the forward fins 39. The swept back wings 49 have outside edges 53 and the two rudders 51 are mounted substantially at right angles to the swept back wings 49 adjacent the outside edges 53. As best seen in FIG. 2, the two rudders 51 are triangular plates. As best seen by comparing FIG. 4 and FIG. 5, for high speed operation, the size of the two rudders 51 is substantially reduced from the size of the two rudders 51 used with a rudder for slow speed operation.

The swept back wings have a curved slot 55 in it and a bolt opening 56 through the swept back wings 49 located toward the forward end 17 from the curved slot 55. A bolt hole 57, which is threaded, is located beneath the bolt opening 56 and a bolt 59 is placed through the bolt opening 56 into the bolt hole 57 but does not secure the swept back wings to the upper enclosure 39 but rather serves as a pivot point for the tail rudder 47. A retainer bolt 61 is placed through the curved slot 55 and is secured into the upper enclosure 29 at a pivot hole 63 which is also threaded. The retainer bolt 61 secures the tail rudder 47 in place at whatever angle is desired for any specific operation.

To fish the surface, the tail rudder 47 is turned to the maximum position. This results at low speeds to turn the fishing lure to it's side. The extent to which the tail rudder 47 is turned, controls the extent of the roll of the fishing lure. The tail rudders 51 used for low speed operation are larger triangular plates which move the fishing lure away from the boat. Conversely, the high speed rudders 51, which are much smaller triangular plates, are turned to drive the fishing lure toward the boat which reduces roll.

The base platform 13 at its forward end 17 is rounded and then expands to a width just slightly less than the forward fins 39 forming a wide section 65. The base platform 13 narrows to form a narrow section 67 having a width just slightly greater than the upper enclosure 29 as the base platform 13 extends toward the tail end 19. The narrow section 67 is substantially narrower than the wide section 65. A slot 69 is located in the center of the narrow section 67 of the base platform 13 toward the tail end 19.

A fishing bait hook 71 is mounted to rotate in the slot 69 located in the narrow section 67 of the base platform 13. The fishing bait hook 71 has a crescent shape with a pair of indentations 73. On the base platform 13 facing the upper body 11, a pair of mountings 75 are secured on opposite sides of the slot 69. The fishing bait hook 71 is mounted at one end to rotate in the pair of mountings 75. On the side of the base platform 13 opposite from the pair of mountings 75, a single mounting 77 is located with a threaded opening 79 through it generally parallel to the base platform 13. The single mounting 77 is located slightly toward the forward end 17 of the base platform 13 from the slot 69. A bolt 81 is placed in the threaded opening 79 and when tightened down against the fishing bait hook 71, the bolt 81 holds the fishing bait hook 71 in place. However, by turning the bolt 81 back, the fishing bait hook 71 may be released.

The bolt 81 intersects the fishing bait hook 71 at a point just inside the end of the fishing bait hook 71. The fishing bait hook 71 is set by holding the fishing lure and loosening the bolt 81 until the fishing bait hook 71 opens. The fishing bait hook 71 is then closed and the bolt 81 is tightened two turns. In this manner, the fishing bait hook 71 will pull past the bolt 81 when a fish is caught. At that point, the fishing lure is disengaged and the fish is taken in the usual known techniques using a fishing pole. It should be noted that the fishing bait hook 71 must open to the rear as the fishing line goes to the boat forward of the fishing lure.

To utilize the fishing lure as a down rigger, either the most forward or rear tow points are used with tail rudder 47 in a straight position which means that the tail rudder 47 is aligned with the keel 15. Of the five openings 41, the one which is closest to the forward end 17 results in the most shallow dive and the one closest to the tail end 19 results in the deepest dive.

To utilize the fishing lure as an outrigger, surface fishing is accomplished with the forward fins 39 located closest to the tail rudder 47 as shown in FIG. 3. The tail rudder 47 is swung to its most extreme position. The use of different ones of the five openings 41 as tow points results in a range of angles to the boat that ranges from large to small.

The operation of out and down with the fishing lure is achieved with the tail rudder 47 placed only moderately off the center position. With this operation, the fishing lure will go out from the boat and then down.

To accomplish high speed trolling, the tail rudder 49 intended for high speed operation (FIG. 5) must be employed. The tail rudder 49 is turned inboard to drive the fishing lure toward the boat. The forward fins 39 are located in a position closest to the forward end.

A predator pattern is achieved by playing out forty to fifty yards of line between the boat and the fishing lure. If the line is connected to the opening of the five openings 41 closest to the tail end 19, a thirty to forty foot dive will result. If the opening of the five openings 41 closest to the forward end 17 is utilized, a twenty foot dive will be achieved.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A fishing lure for use in fishing to be towed with a bait line attached to it to lure fish, the fishing lure comprising:
   a keel, the keel being a flat sheet with a forward end and a tail end and an upper edge and a lower edge;
   a keel member having a forward end and a tail end, the keel member being an elongated sheet with a longitudinal axis affixed generally at right angles to the upper edge of the keel, the keel extending generally along the longitudinal axis of the keel member;
   a base platform having a forward end and a tail end, the keel being secured at its lower edge to the base platform substantially at right angles to the base platform;
   an upper enclosure having a forward end and a tail end, the keel member being secured to the upper enclosure, the upper enclosure having an upper surface;
   forward fins removably mounted on the upper surface of the upper enclosure toward the forward end of the upper enclosure;
   a tail rudder removably mounted on the upper surface of the upper enclosure toward the tail end of the upper enclosure, the tail rudder including a pair of swept back wings and a pair of rudders, each swept back wing having an outside edge, each rudder being mounted on one of the swept back wings adjacent the outside edge and extending toward the base platform; and
   a fishing bait hook mounted on the base platform.

2. A fishing lure according to claim 1 wherein the keel member is bent toward the keel between the keel and the tail end of the keel member.

3. A fishing lure according to claim 1 wherein the base platform has a longitudinal axis and is a flat sheet with a forward end that is rounded and which extends outwardly from the longitudinal axis to form a wide section.

4. A fishing lure according to claim 1 wherein the base platform has a narrow section extending from the keel to the tail end of the base platform.

5. A fishing lure according to claim 1 wherein:
   the base platform has a longitudinal axis and is a flat sheet with a forward end that is rounded and which extends outwardly from the longitudinal axis to from a wide section and wherein the base platform further has a narrow section extending from the keel to the tail end of the base platform.

6. A fishing lure according to claim 1 wherein the forward end and the tail end of of the keel slope toward one another.

7. A fishing lure according to claim 1 wherein the upper enclosure has the cross section of an inverted U.

8. A fishing lure according to claim 1 wherein the upper enclosure and the keel member from an upper body.

9. A fishing lure according to claim 1 wherein the upper surface of the upper enclosure is generally flat and has a forward section and a tail section, the tail section of the upper surface being slightly further from the base platform than the forward section of the upper surface.

10. A fishing lure according to claim 1 wherein the forward fins are swept back and slope downwardly toward the base platform.

11. A fishing lure according to claim 1 wherein the upper enclosure includes means for rotatably mounting the tail rudder in a plurality of angular positions.

12. A fishing lure according to claim 1 further including means to retain the fishing bait hook in a closed position and to permit the opening of the fishing bait hook.

13. A fishing lure for use in fishing to be towed with a bait line attached to it to lure fish, the fishing lure comprising:

a keel, the keel being a flat sheet with a forward end and a tail end and an upper edge and a lower edge;

a keel member having a forward end and a tail end and having a longitudinal axis extending from the forward end to the tail end, the keel member being an elongated sheet affixed generally at right angles to the upper edge of the keel, the keel extending from the forward end of the of the keel member toward the tail end of the keel member generally along the longitudinal axis of the keel member, the keel member being bent toward the keel between the keel and the tail end of the keel member;

a base platform having a forward end and a tail end and having a longitudinal axis, the base platform being a flat sheet with the forward end being rounded and extending outwardly from the longitudinal axis to form a wide section, the keel being secured to the base platform generally at the wide section substantially at right angles to the base platform and along the longitudinal axis, the base platform having a narrow section substantially narrower than the wide section, the narrow section extending from the keel to the tail end of the base platform;

an upper enclosure having the cross section of an inverted U and having a longitudinal axis, the keel member being secured substantially at right angles to the upper enclosure, the upper enclosure and the keel member forming an upper body, the upper body having a forward end and a tail end, the upper enclosure having an upper surface, the upper surface of the upper enclosure having a forward section and a tail section being generally flat;

forward fins removably mounted on the forward section of the upper surface, the forward fins being swept back and sloping downwardly toward the base platform from the upper surface, the upper enclosure including means to mount the forward fins in a plurality of positions in relation to the forward end of the upper body;

a tail rudder removably mounted on the tail section of the upper surface of the upper enclosure, the tail rudder including a pair of swept back wings, each swept back wing having an outside edge, each outside edge being remote from the upper enclosure, a pair of rudders, each rudder being mounted on one of the swept back wings adjacent the outside edge and extending toward the base platform, the rudders being generally parallel to one another and having a triangular shape sloping toward the tail end of the base platform; and a fishing bait hook mounted on the narrow section of the base platform.

14. A fishing lure according to claim 13 wherein the narrow section of the base platform has a slot in it.

15. A fishing lure according to claim 13 wherein, the tail section of the upper surface being slightly further from the base platform than the forward section of the upper surface.

16. A fishing lure according to claim 13 wherein the forward fins include multiple openings for towing.

17. A fishing lure according to claim 13 wherein the upper enclosure includes means for rotatably mounting the tail rudder in a plurality of angular positions.

18. A fishing lure according to claim 13 wherein the narrow section of the base platform has a slot in it and the fishing bait hook is mounted to rotate in the slot in the narrow section of the base platform.

19. A fishing lure for use in fishing to be towed with a bait line attached to it to lure fish, the fishing lure comprising:

a keel, the keel being a flat sheet with a forward end and a rearward end and an upper edge and a lower edge;

a keel member having a forward end and a tail end and having a longitudinal axis extending from the forward end to the tail end, the keel member being an elongated sheet affixed generally at right angles to the upper edge of the keel, the keel extending from the forward end of the keel member toward the tail end of the keel member generally along the longitudinal axis of the keel member, the keel member being bent toward the keel between the keel and the tail end of the keel member;

a base platform having a forward end and a tail end and having a longitudinal axis, the base platform being a flat sheet with the front end being rounded and extending outwardly from the longitudinal axis to form a wide section, the keel being secured to the base platform generally at the wide section substantially at right angles to the base platform and along the longitudinal axis, the base platform having a narrow section substantially narrower than the wide section, the narrow section extending from the keel to the tail end of the base platform, the narrow section having a slot in it along the longitudinal axis, the forward end of the keel and the tail end of the keel sloping toward each other;

an upper enclosure having the cross section of an inverted U and having a longitudinal axis, the keel member being secured substantially at right angles to the upper enclosure, the upper enclosure and the keel member forming an upper body, the upper body having a forward end and a tail end, the upper enclosure having an upper surface, the upper surface of the upper enclosure being generally flat, the upper surface having a forward section and a tail section, the tail section of the upper surface being slightly further from the base platform than the forward section of the upper surface;

forward fins removably mounted on the forward section of the upper surface, the forward fins being swept back and sloping downwardly toward the base platform from the upper surface, the upper enclosure including means to mount the forward fins in a plurality of positions in relation to the forward end of the upper body, the forward fins including multiple openings for towing;

a tail rudder removably mounted on the tail section of the upper surface of the upper enclosure, the tail rudder including a pair of swept back wings, each swept back wing having an outside edge, each outside edge being remote from the upper enclosure, a pair of rudders, each rudder being mounted on one of the swept back wings adjacent the outside edge and extending toward the base platform, the rudders being generally parallel to one another and having a triangular shape sloping toward the tail end of the base platform, the upper enclosure including means for rotatably mounting the tail rudder in a plurality of angular positions on the tail section of the upper surface;

a fishing bait hook mounted to rotate in the slot in the narrow section of the base platform; and means to retain the fishing bait hook in a closed position and to permit opening of the fishing bait hook.

20. A fishing lure according to claim 19 wherein the multiple openings for towing are generally aligned with the longitudinal axis of the upper enclosure.

* * * * *